US012769319B2

(12) United States Patent
Thompson et al.

(10) Patent No.: US 12,769,319 B2
(45) Date of Patent: Oct. 20, 2026

(54) SYSTEMS AND METHODS FOR ENABLING VEHICLE MOVEMENT VIA FORCE APPLIED TO AN EXTERNAL INTERFACE

(71) Applicant: Ford Global Technologies, LLC, Dearborn, MI (US)

(72) Inventors: Scott Steadmon Thompson, Belleville, MI (US); David Hancock, South Rockwood, MI (US); John Eric Rollinger, Troy, MI (US); Pietro Buttolo, Dearborn Heights, MI (US); Matthew Ryan Preston, Whitmore Lake, MI (US); Joseph Dorigo, Plymouth, MI (US)

( * ) Notice: Subject to any disclaimer, the term of this patent is extended or adjusted under 35 U.S.C. 154(b) by 129 days.

(21) Appl. No.: 18/592,159

(22) Filed: Feb. 29, 2024

(65) Prior Publication Data

US 2025/0278084 A1 Sep. 4, 2025

(51) Int. Cl.

*G05D 1/223* (2024.01)
*G05D 1/622* (2024.01)
*G05D 1/65* (2024.01)
*G05D 109/10* (2024.01)

(52) U.S. Cl.

CPC ............. *G05D 1/223* (2024.01); *G05D 1/622* (2024.01); *G05D 1/65* (2024.01); *G05D 2109/10* (2024.01)

(58) Field of Classification Search

CPC .......... G05D 1/223; G05D 1/65; G05D 1/622; G05D 2109/10

See application file for complete search history.

(56) References Cited

U.S. PATENT DOCUMENTS 6,115,030 A * 9/2000 Berstis .................. G05G 9/047 345/161
9,272,889 B2 * 3/2016 Guglielmo ............ B66F 11/046
10,773,642 B2 9/2020 Cunningham, III et al.
(Continued)

FOREIGN PATENT DOCUMENTS

CN 108027651 B 12/2020
KR 20150093039 A * 8/2015 ............. G06F 17/10
RU 2301439 C1 * 6/2007

OTHER PUBLICATIONS

KR20150093039A machine translation (Year: 2015).*
(Continued)

*Primary Examiner* — Navid Z. Mehdizadeh
*Assistant Examiner* — Oliver Tan
(74) *Attorney, Agent, or Firm* — Frank Lollo; Eversheds Sutherland (US) LLP

(57) ABSTRACT

A vehicle including a transceiver and a processor is disclosed. The transceiver may be configured to receive a signal indicative of a force applied by a user on an external interface. The external interface may be configured to be removably attached to the vehicle. The processor may be configured to obtain information associated with a desired virtual vehicle mass and information associated with one or more friction forces acting on the vehicle. The desired virtual vehicle mass may be less than an actual vehicle mass. The processor may further determine a target vehicle velocity based on the signal, the desired virtual vehicle mass and the information associated with the friction forces, and control a vehicle movement based on the target vehicle velocity.

20 Claims, 6 Drawing Sheets

(56) References Cited

U.S. PATENT DOCUMENTS

| | | | | |
|---|---|---|---|---|
| 2006/0116204 A1* | 6/2006 | Chen | A63H 30/04 | |
| | | | 463/37 | |
| 2007/0106475 A1* | 5/2007 | Kondoh | G02B 27/01 | |
| | | | 340/436 | |
| 2008/0103639 A1* | 5/2008 | Troy | G05D 1/005 | |
| | | | 701/2 | |
| 2017/0197619 A1* | 7/2017 | Kelly | B60W 10/04 | |
| 2021/0179134 A1 | 6/2021 | Zhu et al. | | |
| 2022/0283602 A1* | 9/2022 | Battlogg | F16H 59/02 | |

OTHER PUBLICATIONS

RU2301439C1 machine translation (Year: 2007).*

Mebesafe, A Nudge in the Car To Increase Attention, https://www.mebesafe.eu/a-nudge-in-the-car-to-increase-attention/, 2023, pp. 1-3.

Randi Karlsen, et. al., Recommendations With a Nudge, https://www.mdpi.com/journal/technologies, UIT the Arctic University of Norway, Jun. 13, 2019, pp. 1-16.

Mvek Choudhary, et.al., Nudging Drivers to Safety: Evidence From a Field Experiment, Nov. 19, 2019, INSEAD, https://papers.ssrn.com/sol3/papers.cfm?abstract_id=3491302, pp. 1-31.

* cited by examiner

SYSTEMS AND METHODS FOR ENABLING VEHICLE MOVEMENT VIA FORCE APPLIED TO AN EXTERNAL INTERFACE

FIELD

The present disclosure relates to systems and methods for enabling vehicle movement via a force applied to an external interface configured to be removably attached to a vehicle exterior surface.

BACKGROUND

Users may move their vehicles over relatively short distances frequently when the users may be performing outdoor activities or tasks. For example, a user performing an outdoor activity in a farm (e.g., laying fences) may frequently move the user's vehicle over short distances (e.g., 5-10 meters) as the user performs the activity.

It may be inconvenient for the user to frequently enter and move the vehicle and then exit the vehicle multiple times to perform the activity, and hence the user may not prefer to enter the vehicle frequently when the user may be performing such activities. Therefore, it may be desirable to have a system that may enable the user to conveniently move the vehicle over relatively short distances without repeatedly entering and exiting the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
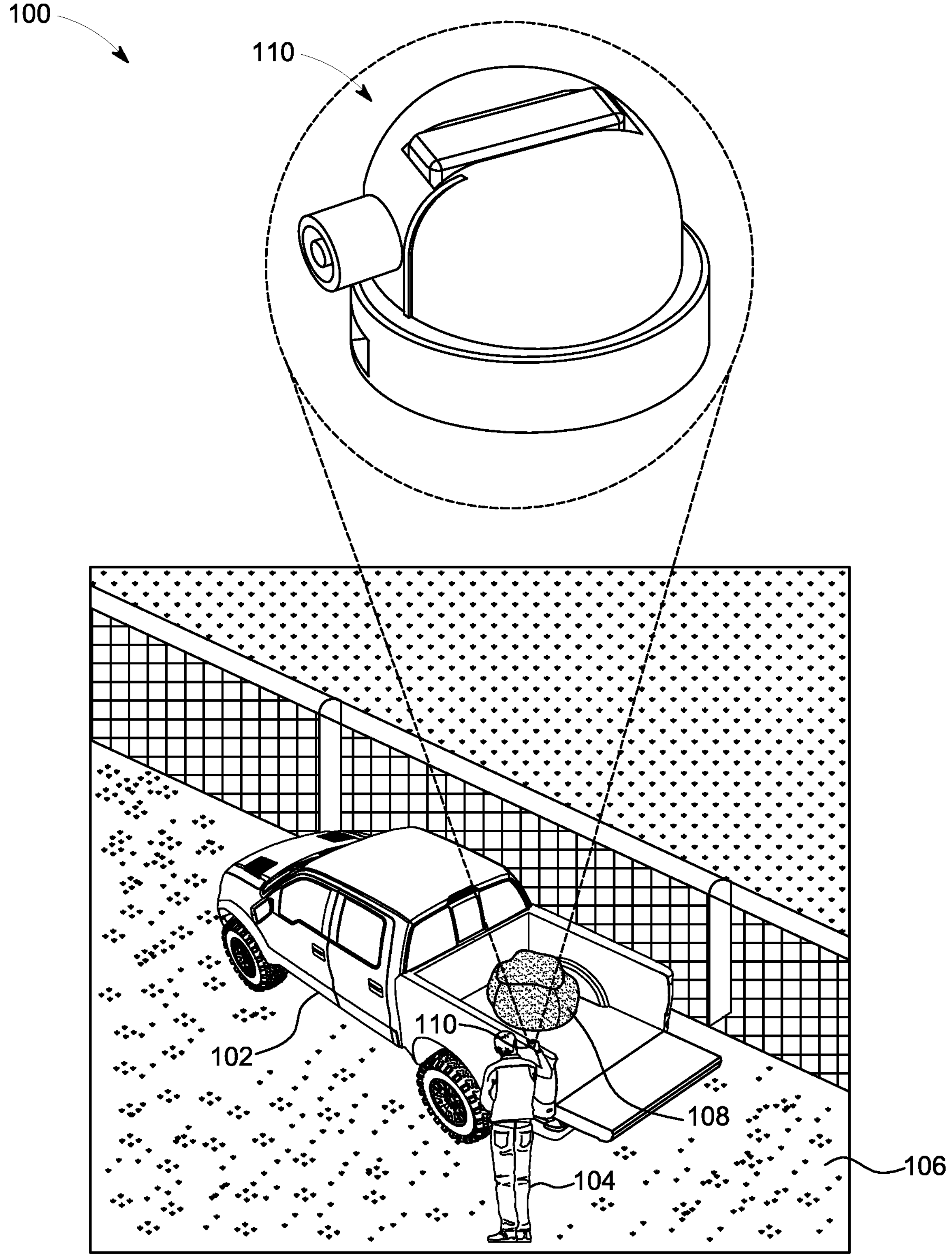
FIG. 1 depicts an environment in which techniques and structures for providing the systems and methods disclosed herein may be implemented.

The present disclosure describes a vehicle that may be moved by using an external interface that may be removably attached to a vehicle exterior surface. A user may cause a vehicle movement by providing a force to the interface, which may transmit a signal indicative of the force via a wired connection or a wireless network to the vehicle to cause the vehicle movement. In some aspects, the vehicle may be configured to make the user feel as if the user may be pushing or pulling a light-weight vehicle or a light shopping cart/toy car with a mass considerably less than an actual vehicle mass, when the user applies the force on the interface to move the vehicle.

To make the user feel that the user may be pushing or pulling a light-weight vehicle, the vehicle may first obtain information associated with a desired mass (or a "desired virtual vehicle mass") of the light-weight vehicle that the user should feel when the user interacts with the interface or applies force to the interface to move the vehicle. The vehicle may further obtain information associated with one or more friction forces that may be acting on the vehicle. The vehicle may then calculate a target vehicle velocity based on the desired virtual vehicle mass, the force applied by the user on the interface and the friction forces acting on the vehicle.

Responsive to calculating the target vehicle velocity, a processor or a proportional-integral-derivative controller (PID controller) associated with the vehicle may compare an actual vehicle velocity with the target vehicle velocity and control the vehicle movement based on the comparison. Specifically, the processor/PID controller may determine a torque to be applied to vehicle axles/wheels based on a difference between the actual vehicle velocity and the target vehicle velocity, to cause the actual vehicle velocity to become equal to the target vehicle velocity. Responsive to determining the torque, the processor may transmit a signal indicative of the determined torque to the vehicle axles/wheels to cause the vehicle movement based on the torque.

The processor may further determine and/or update the torque based on one or more additional parameters/factors including, but not limited to, a maximum permissible vehicle velocity threshold, a maximum permissible rate of change of vehicle velocity threshold, a vehicle steering angle, an inclination angle or a grade of a road/surface on which the vehicle may be travelling, and/or the like.

The vehicle may be further configured to cause the interface to apply a restrictive force when an obstacle may be present in proximity to the vehicle. The restrictive force may provide an indication to the user that the obstacle may be present in proximity to the vehicle, and hence the user may accordingly perform one or more remedial actions (e.g., maneuver vehicle movement away from the obstacle, reduce vehicle speed, etc.) to prevent the vehicle from getting close to the obstacle. The vehicle may also stop the vehicle movement when the vehicle may get too close to the obstacle (e.g., within a predefined distance from the obstacle).

The present disclosure discloses a vehicle that may be moved by providing inputs/force to an interface that may be removably attached to a vehicle exterior surface. The interface may enable the user to cause the vehicle movement without having to enter the vehicle interior portion. Since the user is not required to enter the vehicle to cause the vehicle movement, the interface may facilitate the user in performing outdoor activities such as farming, laying fences, etc., which may require frequent vehicle movement over short distances. Further, the vehicle may make the user feel as if the user may be pushing/pulling a light-weight vehicle or a light shopping cart/toy car with a mass considerably less than an actual vehicle mass via the interface, which may enhance user's ease of moving the vehicle by using the interface.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a user 104. The user 104 may be performing an outdoor activity in a farm 106 where the vehicle 102 may be located. For example, the user 104 may be sowing plants on a farm periphery or may be laying fences. The user 104 may be using vehicle cargo bed to store material 108 that may be required to perform the outdoor activity, e.g., sand, plants, equipment/tools, manure, and/or the like. In some aspects, the user 104 may be required to move the vehicle 102 frequently over short distances (e.g., 5-10 meters) as the user 104 performs the outdoor activity around the farm periphery.

The vehicle 102 may take the form of any passenger or commercial vehicle such as a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode and may include any powertrain such as a gasoline engine, one or more electrically-actuated motor(s), a hybrid system, etc.

The environment 100 may further include an external interface 110 (or interface 110) that may be configured to be removably attached to a vehicle exterior portion/surface (or a vehicle interior surface). In some aspects, the vehicle exterior surface may include one or more cavities or slots or connection ports into which the user 104 may insert/attach or "plug-in" the interface 110. As an example, the connection ports may be disposed on a top surface of vehicle side walls, on right and left edges of a vehicle bumper, a vehicle cargo bed, and/or the like. In the exemplary aspect depicted in FIG. 1, the interface 110 is attached to the top surface of a vehicle side wall, although the present disclosure is not limited to such an aspect.

The interface 110 may be configured to cause and/or control vehicle movement based on user inputs or a force that the user 104 may apply on the interface 110. In some aspects, the user 104 may not be required to enter and exit the vehicle 102 multiple times to frequently move the vehicle 102 over the short distances around the farm periphery by using the interface 110. Since the interface 110 may be configured to be removably attached to the vehicle exterior surface, the user 104 may conveniently cause and control the vehicle movement from outside the vehicle 102 by using the interface 110 (e.g., by applying a push, a pull or a sideways force on the interface 110).

In some aspects, the interface 110 may be configured to cause and/or control the vehicle movement when the interface 110 may be attached to the vehicle 102 and the user 104 applies a force on the interface 110. The interface 110 may be configured to generate a signal indicative of the force applied by the user 104 on the interface 110 and transmit the signal (wirelessly or via a wired connection) to the vehicle 102, causing the vehicle 102 to move based on the signal.

In some aspects, the interface 110 may be dome-shaped (as shown in FIG. 1) and may include a user input detection unit (not shown) including, but not limited to, pressure sensors, a spring-loaded rotary position sensing element, and/or the like, which may detect user inputs associated with a desired vehicle movement when the user 104 interacts with the interface 110 (e.g., applies a force on the interface 110). As an example, the user 104 may provide a "forward push" or a forward directed force to the interface 110 when the user 104 desires the vehicle 102 to move forward. The forward push/force may be detected by the pressure sensors included in the user input detection unit, and the pressure sensors may then generate the signal indicative of the force that may be transmitted, e.g., via a wired connection or a wireless network, to the vehicle 102 to cause a vehicle forward movement. Similarly, the user 104 may provide a "backward push" or a backward directed force to the interface 110 when the user 104 desires the vehicle 102 to move in a reverse direction. Furthermore, the user 104 may rotate the interface 110 in a clockwise or a counterclockwise direction when the user 104 desires a vehicle steering wheel to rotate right or left. In this case, the spring-loaded rotary position sensing element may generate the signal that may enable the vehicle 102 to cause the vehicle steering wheel to rotate right or left.

In other aspects, the interface 110 may have a shape of an elongated rod or stick and may act like a joystick having one or more tilt sensors, torsional motion sensors, and/or the like. Although FIG. 1 depicts the interface 110 to be dome-shaped, such depiction should not be construed as limiting, and the interface 110 may have any other shape as described above.

In some aspects, the vehicle 102 may be configured to make the user 104 feel as if the user 104 may be pushing a light-weight vehicle or a light shopping cart/toy car with a mass considerably less than an actual vehicle mass (which may be in a range of 4,000 to 6,000 pounds), when the user 104 applies the force on the interface 110 to move the vehicle 102. Stated another way, the vehicle 102 may make the user 104 feel as if the user 104 is pushing a "weightless" vehicle or a vehicle with a considerably less mass/weight (than the actual vehicle mass) in a range of 100-200 pounds, when the user 104 applies the force on the interface 110 to move the vehicle 102. Such a feeling of pushing/pulling a light-weight vehicle via the interface 110 may enhance user's convenience of moving the vehicle 102 by using the interface 110. In some aspects, the vehicle 102 may provide the "weightlessness" experience or a feeling to the user 104 that the user 104 may be pushing/pulling a considerably lighter vehicle irrespective of whether the vehicle 102 may be travelling on a level road or an inclined surface, a concrete road or a field, and/or travelling on mud, snow, sand, etc. The process of causing the vehicle movement when the user 104 applies a force on the interface 110, while making the user 104 feel as if the force is applied to a light-weight vehicle, is briefly described below and described in detail later in the description in conjunction with FIG. 2.

The vehicle 102 may first determine a desired mass (or a "desired virtual vehicle mass") of the light-weight vehicle that the user 104 should feel when the user 104 interacts with the interface 110 or applies force to the interface 110. In some aspects, the desired virtual vehicle mass may be indicative of a virtual mass associated with the vehicle 102 (e.g., in a range of 100-200 pounds) configured to be felt by the user 104 when the user 104 applies the force on the interface 110 to enable the movement of the vehicle 102. The vehicle 102 may determine the desired virtual vehicle mass based on user inputs or user preferences, or inputs provided by a vehicle manufacturer or an interface manufacturer that may be pre-stored in a vehicle memory (shown as memory 244 in FIG. 2).

In addition to determining the desired virtual vehicle mass, the vehicle 102 may obtain, from the interface 110, the signal indicative of the force applied by the user 104 on the interface 110. The vehicle 102 may then determine an amount of force that the user 104 may have applied to the interface 110 based on the signal. The vehicle 102 may further determine an amount of one or more friction forces that may be acting on the vehicle 102. Examples of such friction forces include, but are not limited to, a Coulomb friction, a viscous friction, a Stribeck friction, and/or the like.

Responsive to obtaining/determining the information described above, the vehicle 102 may determine a target vehicle velocity at which the vehicle 102 may move based on the signal indicative of the force applied by the user 104 on the interface 110 (or the amount of force that the user 104 may have applied on the interface 110), the amount of friction forces that may be acting on the vehicle 102, and the desired virtual vehicle mass. In some aspects, to determine the target vehicle velocity, the vehicle 102 may first calculate an "effective" force based on the force applied by the user 104 on the interface 110 and the amount of friction forces (e.g., by subtracting the amount of friction forces from the amount of force that the user 104 may have applied to the interface 110), and the vehicle 102 may then determine a target or desired rate of change of vehicle velocity by dividing the calculated effective force with the desired virtual vehicle mass. The vehicle 102 may then determine the target vehicle velocity based on the determined target or desired rate of change of vehicle velocity. A person ordinarily skilled in the art may appreciate that since vehicle velocity is a function of the rate of change of vehicle velocity (specifically, $$\frac{d(\text{vehicle velocity})}{d(\text{time})} = (\text{rate of change of vehicle velocity})),$$

the vehicle 102 may easily determine the target vehicle velocity at any time based on the determined target or desired rate of change of vehicle velocity.

Since the vehicle 102 determines the target vehicle velocity by dividing the calculated effective force with the desired virtual vehicle mass (and not the actual vehicle mass that may be considerably greater than the desired virtual vehicle mass), the user 104 may not be required to apply substantial force on the interface 110 to cause the vehicle 102 to move at the target vehicle velocity, thereby making the user 104 feel as if the user 104 is pushing or pulling a light-weight vehicle.

Stated another way, if the vehicle 102 were to determine the target vehicle rate of change of velocity by dividing the calculated effective force with the actual vehicle mass, the user 104 may have been required to apply substantially greater force on the interface 110 to cause the vehicle 102 to quickly reach the same target vehicle velocity, which may have caused inconvenience to the user 104 (or may have made it is considerably challenging for the user 104 to move the vehicle 102 via the interface 110). By determining the time needed by the vehicle 102 to reach target velocity based on the desired virtual vehicle mass for a specific force applied, the vehicle 102 may enable the user 104 to cause the vehicle movement by applying substantially less force, and hence provide a feeling to the user 104 that the user 104 may be pushing/pulling a "weightless" vehicle or a light-weight shopping cart/toy car. Additionally, friction opposing motion is typically a function of the mass of the vehicle. By reducing the "friction" felt as the user 104 pushes on the vehicle 102, the same target velocity will be achieved by much a gentler effort.

Responsive to determining the target vehicle velocity as described above, the vehicle 102 may control the vehicle movement such that the vehicle 102 moves at the target vehicle velocity. In this case, a proportional-integral-derivative controller (PID controller) or a vehicle processor (shown as processor 242 in FIG. 2) associated with the vehicle 102 may track/monitor an actual vehicle velocity and compare it with the target vehicle velocity. The vehicle processor may then determine a torque to be applied to front and/or rear vehicle wheels based on the comparison (specifically a difference between the target vehicle velocity and the actual vehicle velocity), so that the actual vehicle velocity matches or reaches to the target vehicle velocity. The vehicle processor may further transmit a signal associated with the determined torque to the vehicle axles/wheels, so that the vehicle 102 moves at the target vehicle velocity.

In addition to determining the torque based on the difference between the target vehicle velocity and the actual vehicle velocity, the vehicle processor may determine the torque based on a torque profile applied to the vehicle 102 to overcome an initial stiction associated with the vehicle 102, a maximum permissible vehicle velocity threshold, a maximum permissible rate of change of vehicle velocity threshold, and/or the like. These parameters are described in detail later below in conjunction with FIG. 2.

The vehicle processor may further update the determined torque to an updated torque value (or an updated torque) when the vehicle processor determines that the vehicle may be moving in a wrong direction or the vehicle 102 may not be moving when the torque is applied to the vehicle wheels. The vehicle processor may further update the determined torque to an updated torque based on a plurality of additional parameters including, but not limited to, a vehicle steering angle, an inclination angle or a grade of a road/surface on which the vehicle 102 may be travelling, and/or the like.

In additional aspects, the vehicle 102 may be configured to determine an obstacle presence in proximity to the vehicle 102 and an obstacle distance from the vehicle 102, when the vehicle 102 may be moving based on the force applied by the user 104 on the interface 110. Responsive to determining the obstacle presence and the obstacle distance from the vehicle 102, the vehicle 102 may determine an amount of resistive force that may be applied to the interface 110 based on the obstacle distance. In some aspects, the amount of resistive force may be inversely proportional to the obstacle distance, such that the amount of resistive force may increase as the vehicle 102 gets closer to the obstacle. Responsive to determining the amount of resistive force, the vehicle 102 may transmit a signal to the interface 110 indicative of the amount of resistive force, so that the user 104 may feel the resistive force as the user 104 applies force to the interface 110 when the vehicle 102 may be getting close to the obstacle. The resistive force may indicate to the user 104 that the vehicle 102 may be getting close to the obstacle, and hence the user 104 may take remedial actions (e.g., apply force in an opposite direction on the interface 110 to reduce the vehicle speed, or maneuver vehicle movement away from the obstacle, etc.). In some aspects, the vehicle 102 may update the target vehicle speed based on the amount of resistive force. In further aspects, the vehicle 102 may cause the vehicle movement to stop (irrespective of the force applied by the user 104 on the interface 110) when the obstacle distance may be less than a predefined threshold (e.g., when the obstacle is very close to the vehicle 102).

Further vehicle details are described below in conjunction with FIG. 2.

A person ordinarily skilled in the art may appreciate that as the vehicle velocity becomes equivalent to a user's walking speed (e.g., when the user 104 may be applying force to the interface 110 and walking simultaneously), the user 104 may gradually need to apply less force on the interface 110 to cause the vehicle movement (as a change in vehicle velocity may not necessarily be required when the vehicle velocity reaches an equilibrium with the user's walking speed). In this case, the user 104 may only provide a small force on the interface 110 to overcome any friction forces that may be acting on the vehicle 102 as the vehicle 102 moves and not a higher amount of force that the user 104 may be required to apply on the interface 110 when, for example, the vehicle 102 initially starts movement from zero velocity. Therefore, in accordance with the present disclosure, the force required to be applied by the user 104 on the interface 110 may gradually decrease as the vehicle velocity becomes equivalent to the user's walking speed, thereby further enhancing user's convenience of causing (or maintaining) the vehicle movement using the interface 110.

The vehicle 102 and the interface 110 implement and/or perform operations, as described here in the present disclosure, in accordance with the owner manual and safety guidelines. In addition, any action taken by the user 104 based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
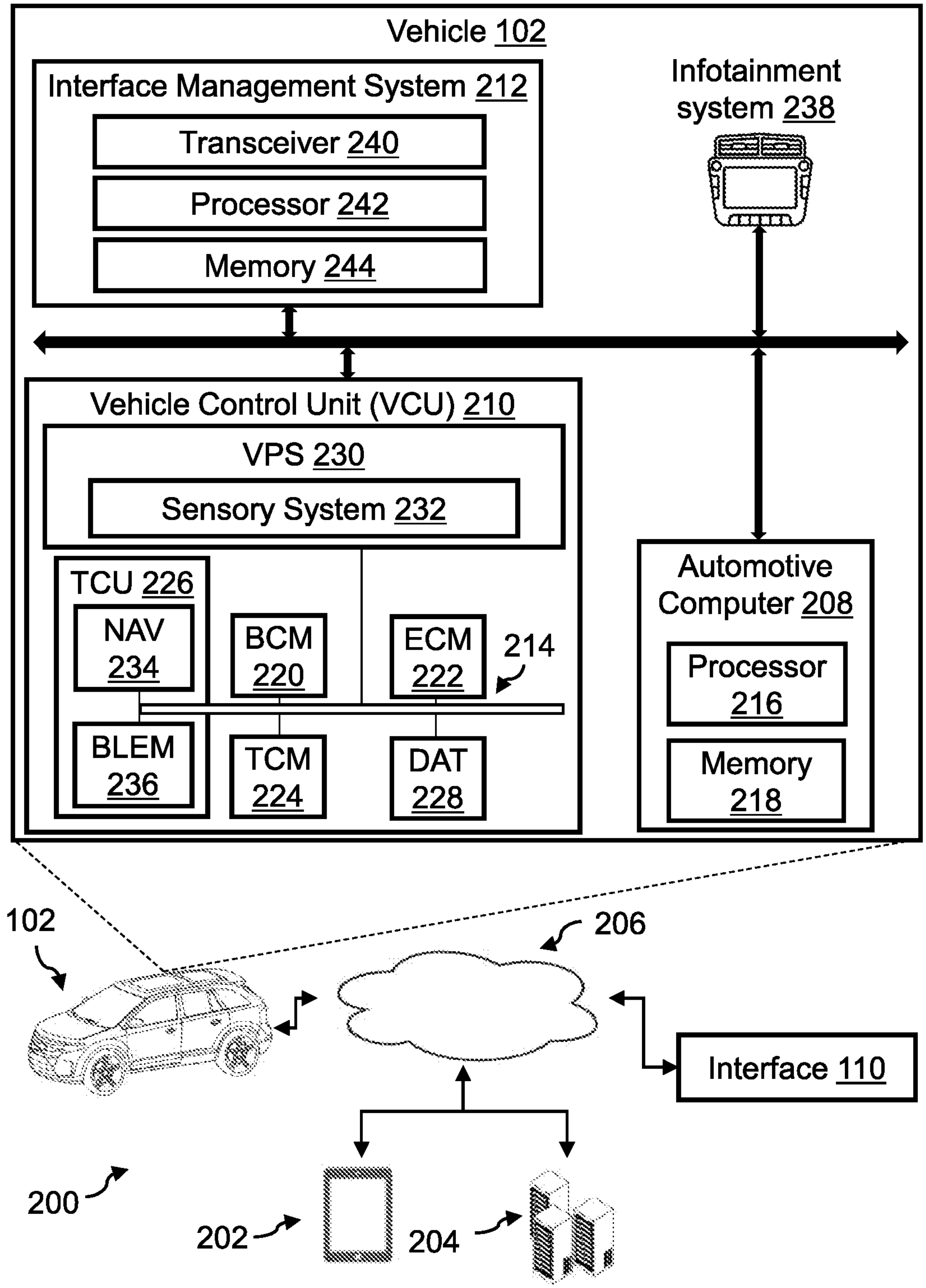
FIG. 2 depicts a block diagram of a system to enable a vehicle movement in accordance with the present disclosure.
Figure 4:
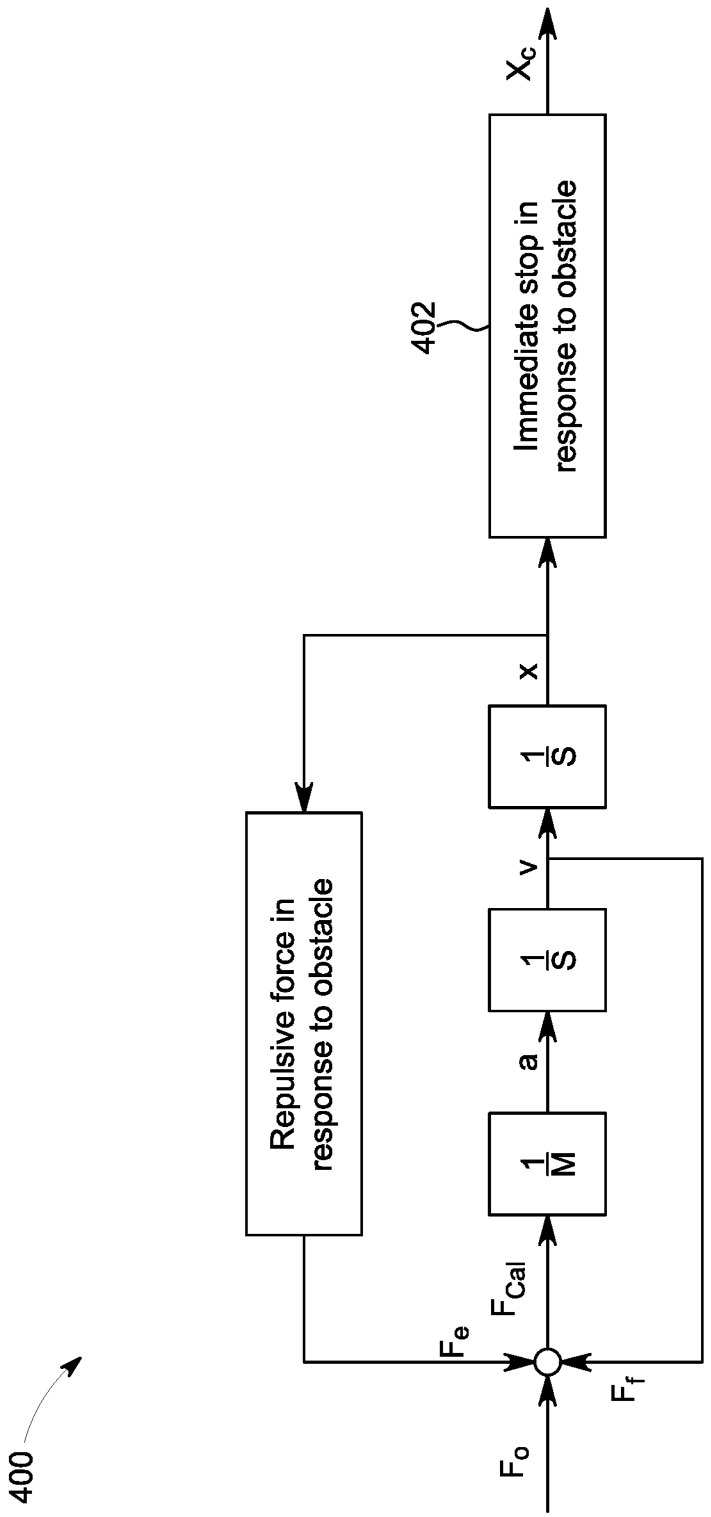
FIG. 4 depicts an example first schematic diagram illustrating a process of determining a target vehicle velocity in accordance with the present disclosure.
Figure 5:
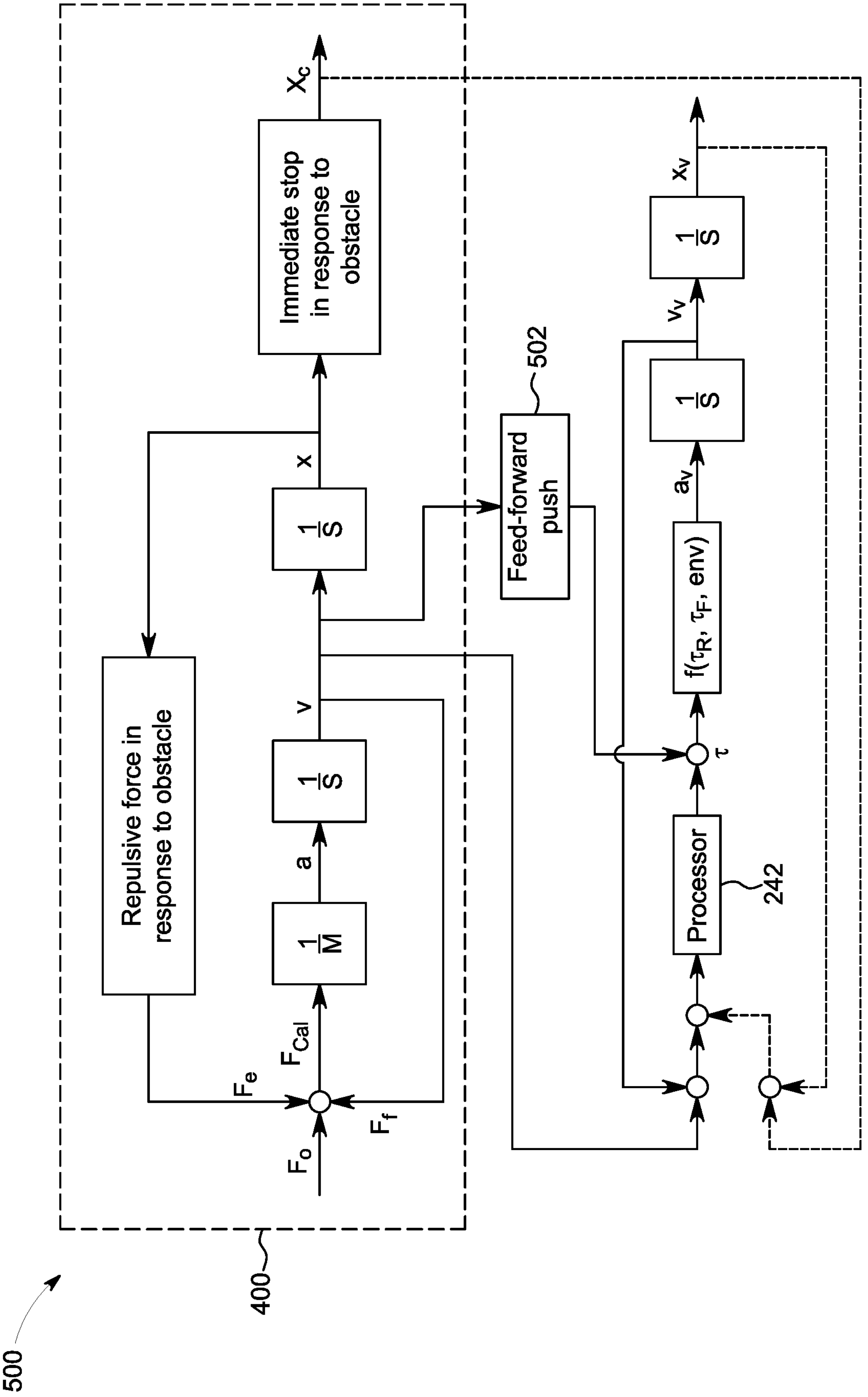
FIG. 5 depicts an example second schematic diagram illustrating a process of controlling a vehicle velocity based on a target vehicle velocity in accordance with the present disclosure.

FIG. 2 depicts a block diagram of a system 200 to enable a vehicle movement in accordance with the present disclosure. While describing FIG. 2, references will be made to FIGS. 3, 4 and 5.

The system 200 may include the vehicle 102, the interface 110, a user device 202, and one or more servers 204 (or server 204) communicatively coupled with each other via one or more networks 206 (or a network 206). In some aspects, the vehicle 102 and the interface 110 may be communicatively coupled with each other via the network 206 as shown in FIG. 2, or via a wired connection.

The user device 202 may be associated with the user 104 and may be, for example, a mobile phone, a laptop, a computer, a tablet, a wearable device, or any other similar device with communication capabilities. The server 204 may be part of a cloud-based computing infrastructure and may be associated with and/or include a Telematics Service Delivery Network (SDN) that provides digital data services to the vehicle 102 and other vehicles (not shown) that may be part of a vehicle fleet. In further aspects, the server 204 may be configured to store and provide information associated with the desired virtual vehicle mass to the vehicle 102 at a predefined frequency, or when the vehicle 102 requests the server 204 to provide the information. The concept of the desired virtual vehicle mass is already described above in conjunction with FIG. 1. In additional aspects, the server 204 may store and provide to the vehicle 102 information associated with the maximum permissible vehicle velocity threshold and/or the maximum permissible rate of change of vehicle velocity threshold when the vehicle movement may be getting controlled by the interface 110. In some aspects, the information associated with the desired virtual vehicle mass, the information associated with the maximum permissible vehicle velocity threshold and/or the maximum permissible rate of change of vehicle velocity threshold may be provided to the server 204 by the user 104 (e.g., via the user device 202), a vehicle manufacturer and/or an interface manufacturer.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and an interface management system 212 (or system 212). The VCU 210 may include a plurality of Electronic Control Units (ECUs) 214 disposed in communication with the automotive computer 208.

In some aspects, the user device 202 may be configured to connect with the automotive computer 208 and/or the system 212 via the network 206, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 208 and/or the system 212 may be installed anywhere in the vehicle 102, in accordance with the disclosure. Further, the automotive computer 208 may operate as a functional part of the system 212. The automotive computer 208 may be or include an electronic vehicle controller, having one or more processor(s) 216 and a memory 218. Moreover, the system 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable storage medium or memory storing an interface management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), and other vehicles (not shown in FIG. 2) operating as part of a vehicle fleet. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle accelerometer, a vehicle gyroscope, a vehicle magnetometer, ultrasonic sensors, etc.

In some aspects, the vehicle sensory system 232 may be configured to detect/determine the amount of one or more friction forces that may be acting on the vehicle 102, when the vehicle 102 may be stationary or moving. In further aspects, the vehicle sensory system 232 may be configured to detect a presence of an obstacle (not shown) in proximity to the vehicle 102 and an obstacle distance from the vehicle 102. In additional aspects, the vehicle sensory system 232 may be configured to determine a vehicle steering wheel angle (or a vehicle steering angle) when the vehicle 102 may be moving. In yet another aspect, the vehicle sensory system 232 may be configured to determine an inclination angle or a grade of a road/surface on which the vehicle 102 may be travelling. Further, the vehicle sensory system 232 may transmit inputs to the system 212 at a predefined frequency (or continuously).

In some aspects, the VCU 210 may control vehicle operational aspects and implement one or more instruction sets received from the server 204, from one or more instruction sets stored in the memory 218, including instructions operational as part of the system 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE® Module (BLEM) 236, a Wi-Fi transceiver, an ultra-wideband (UWB) transceiver, and/or other wireless transceivers (not shown in FIG. 2) that may be configurable for wireless communication (including cellular communication) between the vehicle 102 and other systems (e.g., a vehicle key fob, not shown in FIG. 2, the server 204, the user device 202, the interface 110, etc.), computers, and modules. The TCU 226 may be disposed in communication with the ECUs 214 by way of a bus.

The ECUs 214 may control aspects of vehicle operation and communication using inputs from human drivers, inputs from the automotive computer 208, the system 212, and/or via wireless signal inputs/command signals received via the wireless connection(s) from other connected devices, such as the server 204, the user device 202, the interface 110, among others.

The BCM 220 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2). In some aspects, the BCM 220 may be configured to cause and control the vehicle movement and the vehicle steering wheel rotation based on the command signals (or the user inputs) obtained from the interface 110 and/or the system 212.

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion and/or output or display notifications, navigation maps, etc. on the touchscreen interface portion.

The computing system architecture of the automotive computer 208, the VCU 210, and/or the system 212 may omit certain computing modules. It should be readily understood that the computing environment depicted in FIG. 2 is an example of a possible implementation according to the present disclosure, and thus, it should not be considered as limiting or exclusive.

In accordance with some aspects, the system 212 may be integrated with and/or executed as part of the ECUs 214. The system 212, regardless of whether it is integrated with the automotive computer 208 or the ECUs 214, or whether it operates as an independent computing system in the vehicle 102, may include a transceiver 240, a processor 242, and a computer-readable memory 244.

The transceiver 240 may be configured to receive information/inputs from one or more external devices or systems, e.g., the user device 202, the server 204, the interface 110, and/or the like, via the network 206. Further, the transceiver 240 may transmit notifications, requests, signals, etc. to the external devices or systems. In addition, the transceiver 240 may be configured to receive information/inputs from vehicle components such as the vehicle sensory system 232, one or more ECUs 214, and/or the like. Further, the transceiver 240 may transmit signals (e.g., command signals) or notifications to the vehicle components such as the BCM 220, the infotainment system 238, and/or the like.

The processor 242 and the memory 244 may be same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable storage medium or memory storing the interface management program code. In some aspects, the memory 244 may additionally store the information associated with the desired virtual vehicle mass, the information associated with the maximum permissible vehicle velocity threshold and/or the maximum permissible rate of change of vehicle velocity threshold when the vehicle movement may be getting controlled by the interface 110, and/or the like, which the vehicle 102 may obtain from the server 204, the user 104 (via the user device 202), a vehicle manufacturer, an interface manufacturer, and/or the like.

Figure 3:
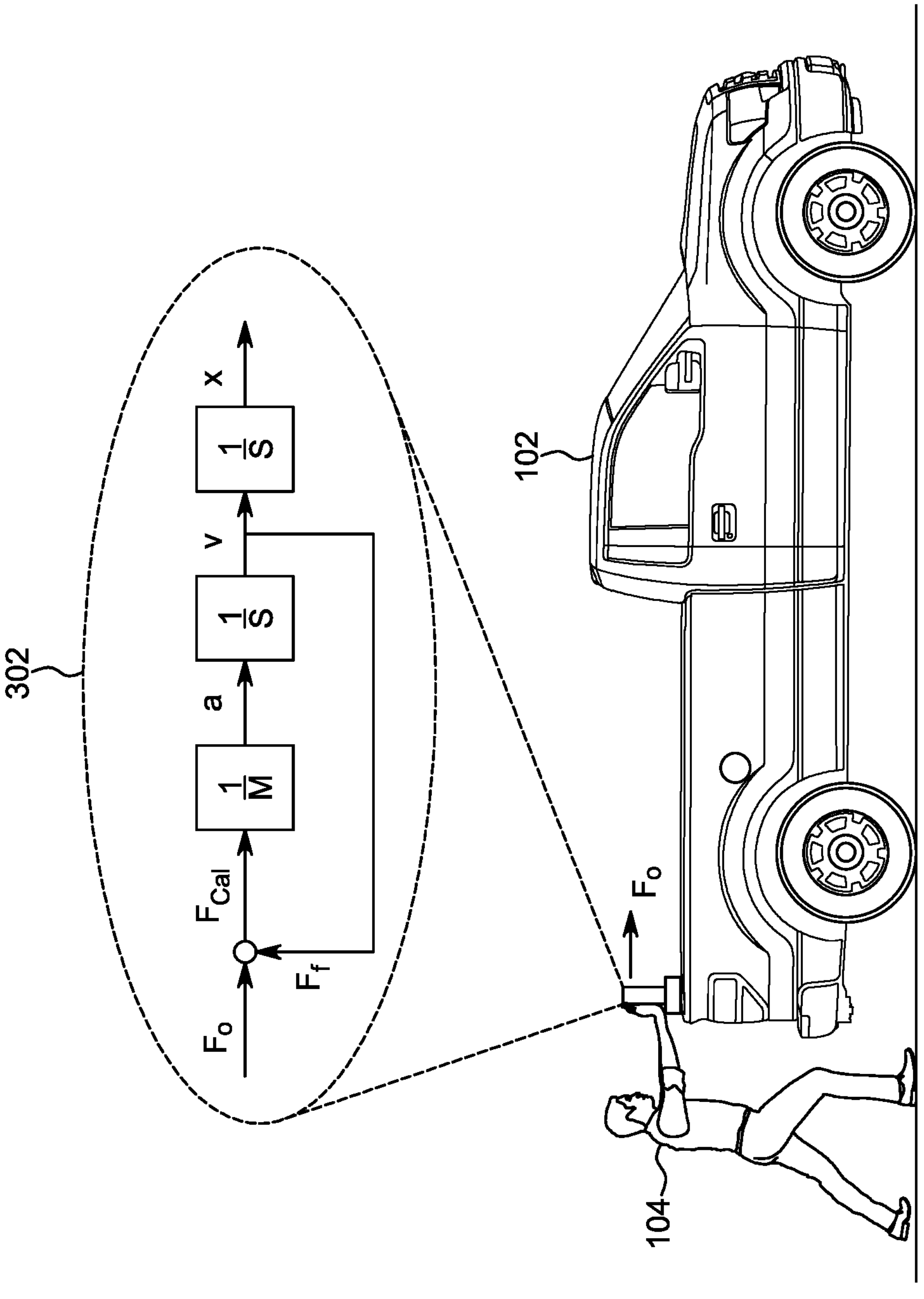
FIG. 3 depicts an example view of a user applying force to an external interface to cause a vehicle movement in accordance with the present disclosure.

In operation, the transceiver 240 may receive a signal (e.g., a first signal) from the interface 110 when the user 104 applies a force to the interface 110 to cause the vehicle movement. As example view of the user 104 applying a force "$F_o$" on the interface 110 to cause the vehicle movement is shown in FIG. 3. In some aspects, the first signal may be indicative of the force "$F_o$". Responsive to receiving the first signal from the interface 110, the transceiver 240 may transmit the first signal to the processor 242.

The processor 242 may obtain the first signal from the transceiver 240. Responsive to obtaining the first signal, the processor 242 may determine the force "$F_o$" that the user 104 may be applying on the interface 110 based on the first signal. In addition, the processor 242 may obtain the information associated with the desired virtual vehicle mass from the memory 244. As described above, the desired virtual vehicle mass may be considerably less than the actual vehicle mass. The concept of the desired virtual vehicle mass is described above in conjunction with FIG. 1. The desired virtual vehicle mass is shown as mass "M" in an example schematic 302 depicted in FIG. 3.

The processor 242 may further obtain information associated with one or more friction forces or the amount of one or more friction forces that may be acting on the vehicle 102 from the vehicle sensory system 232. Examples of the friction forces include, but are not limited to, a Coulomb friction, a viscous friction, a Stribeck friction, and/or the like. A person ordinarily skilled in the art may appreciate that the Coulomb friction is a constant friction that acts on the vehicle 102 independent of the vehicle velocity, the viscous friction is a resistive force proportion to the vehicle velocity, and the Stribeck friction is the friction force that prevents an object (e.g., the vehicle 102) from initiating motion/movement. The amount of friction forces that may be acting on the vehicle 102 is collectively shown as force "$F_f$" in the schematic 302.

Responsive to determining/obtaining the force "$F_o$" and the force "$F_f$", the processor 242 may determine/calculate a target vehicle velocity based on the force "$F_o$" (or the first signal), the desired virtual vehicle mass (or the mass "M") and the force "$F_f$", as described below.

In some aspects, the processor 242 may first calculate an effective force (shown as force "$F_{Cal}$" in the schematic 302) that may act on the mass "M" based on the force "$F_o$" and the force "$F_f$". In an exemplary aspect, the processor 242 may calculate the force "$F_{Cal}$" by subtracting the force "$F_f$" from the force "$F_o$". A person ordinarily skilled in the art may appreciate that since the forces "$F_o$" and "$F_f$" may be dynamic and may keep on changing as the vehicle 102 moves, the force "$F_{Cal}$" may also be dynamic and may change as the vehicle 102 moves.

Responsive to calculating the force "$F_{Cal}$", the processor 242 may calculate a desired rate of change of vehicle velocity (shown as rate "a" in the schematic 302) for the mass "M", based on the "$F_{Cal}$" and the mass "M". A person ordinarily skilled in the art may appreciate that $a=F_{Cal}/M$.

Responsive to calculating the rate "a", the processor 242 may calculate the target vehicle velocity (shown as a target vehicle velocity "v" in the schematic 302) and also a target vehicle position or distance movement (shown as a distance "x" in the schematic 302). A person ordinarily skilled in the art may appreciate that "v" is a function of "a" and time (shown as "1/s" in the schematic 302), and "x" is a function of "v" and time. Therefore, by calculating the rate "a", the processor 242 may easily calculate the target vehicle velocity "v" and/or the distance "x" at any point of time. In this manner, the processor 242 may calculate the target vehicle velocity "v" associated with the mass "M" based on the forces "$F_o$" and "$F_f$" and the mass "M".

As shown in the schematic 302, as the target vehicle velocity "v" changes (increases or decreases), the force "$F_f$" acting on the vehicle 102 may also change/update and may be "fed" as an input to the processor 242, which may further refine or re-calculate the force "$F_{Cal}$" based on the "updated" force "$F_f$". In this manner, the processor 242 may dynamically re-calculate the force "$F_{Cal}$" as the force "$F_f$" changes (and/or when the force "$F_o$" changes), thereby causing the rate "a" to also change dynamically as the vehicle velocity changes. Therefore, the processor 242 may implement a dynamic feedback loop to constantly update the rate "a" (and hence "v" and "x") as the friction forces acting on the vehicle 102 change and/or the force applied on the interface 110 changes.

Responsive to calculating the target vehicle velocity "v", the processor 242 may cause and control the movement of the vehicle 102 (or "vehicle movement") based on the target vehicle velocity "v". The process of causing/controlling the vehicle movement based on the target vehicle velocity "v" is described later in the description below.

In some aspects, when the vehicle 102 may be stationary or moving based on the force "$F_o$" that the user 104 may apply on the interface 110, the processor 242 may obtain additional inputs from the vehicle sensory system 232 and determine an obstacle presence in proximity to the vehicle 102 and an obstacle distance from the vehicle 102 based on the inputs. In an exemplary aspect, the obstacle (not shown) may be another vehicle, a passerby or any other obstruction/environmental constraints that may be located in proximity to the vehicle 102. Responsive to determining/detecting the obstacle presence in proximity to the vehicle 102, the processor 242 may determine an amount of a repulsive force that may be applied to the interface 110 based on the obstacle distance from the vehicle 102. In some aspects, the repulsive force may be applied to the interface 110 to provide an indication to the user 104 that an obstacle may be present in proximity to the vehicle 102, and hence the user 104 should take a remedial action (e.g., apply a negative force or a force in an opposite direction on the interface 110 to reduce vehicle velocity and/or change vehicle movement direction by providing sideways force on the interface 110) to prevent the vehicle 102 from getting close to the obstacle. In an exemplary aspect, the amount of repulsive force determined by the processor 242 may be inversely proportional to the obstacle distance from the vehicle 102 (or a vehicle distance from a virtual boundary of a predefined radius centered at the obstacle). Stated another way, the amount of repulsive force may increase as the vehicle 102 gets closer to the obstacle. As an example, the amount of repulsive force=(a constant "K")/(obstacle distance from the vehicle 102). The determined amount of repulsive force is shown as a force "$F_e$" in a schematic 400 of FIG. 4. The schematic 400 is similar to the schematic 302; however, the schematic 400 additionally includes the aspect of the force "$F_e$" and the obstacle detection by the processor 242 based on the inputs obtained from the vehicle sensory system 232.

Responsive to determining the amount of repulsive force (or the force "$F_e$"), the processor 242 may transmit, via the transceiver 240, a signal (e.g., a second signal) indicative of the force "$F_e$" to the interface 110. The interface 110 may apply the repulsive force "$F_e$" when the user 104 applies the force "$F_o$" to the interface 110, to indicate to the user 104 that an obstacle may be getting close to the vehicle 102.

In further aspects, as shown in the schematic 400, responsive to determining the force "$F_e$", the force "$F_e$" may be "fed back" to the dynamic feedback loop such that the processor 242 may now calculate the effective force "$F_{Cal}$" based on the forces "$F_o$", "$F_f$" and "$F_e$". In an exemplary aspect, in this case, "$F_{Cal}$"="$F_o$"−("$F_f$"+"$F_e$"). A person ordinarily skilled in the art may appreciate from the mathematical expression described herein that as the force "$F_e$" increases (i.e., as the vehicle 102 gets closer to the obstacle), the force "$F_{Cal}$" decreases, resulting in decrease in the rate "a". The rate "a" may even become negative as the force "$F_{Cal}$" becomes negative (e.g., when the obstacle gets very close to the vehicle 102), resulting in reduction in the target vehicle velocity "v". In this manner, the processor 242 may determine the target vehicle velocity "v" based on not only the forces "$F_o$" and "$F_f$" as described above, but may also determine the target vehicle velocity "v" based on the force "$F_e$" when an obstacle is detected in proximity to the vehicle 102.

In some aspects, the processor 242 may further trigger an immediate stop to the vehicle movement (or reduce the target vehicle velocity "v" to zero) when the obstacle distance may be less than a predefined threshold. Stated another way, the processor 242 may cause the vehicle movement to immediately stop when the vehicle 102 gets very close to the obstacle, as shown by a block 402 in the schematic 400. In some aspects, the processor 242 may perform the action of triggering an immediate stop to the vehicle movement irrespective of the force "$F_o$" applied by the user 104 on the interface 110, when the obstacle distance becomes less than the predefined threshold. A distance travelled by the vehicle 102 before the vehicle movement stops is shown as an example distance "$x_c$" in the schematic 400.

As described above, responsive to calculating/determining the target vehicle velocity "v", the processor 242 may cause and control the vehicle movement based on the target vehicle velocity "v". In some aspects, to cause/control the vehicle movement based on the target vehicle velocity "v", the processor 242 may first determine an actual velocity of the vehicle 102 (or an "actual vehicle velocity") based on inputs obtained from the VCU 210. The actual vehicle velocity may be zero when the vehicle 102 may be stationary, or may be a non-zero value when the vehicle 102 may be moving. The actual vehicle velocity is shown as a velocity "$v_v$" in a schematic 500 of FIG. 5.

The schematic 500 depicts an example process of controlling the actual vehicle velocity "$v_v$" based on the target vehicle velocity "v". In some aspects, the steps performed by the processor 242 as described below (and as shown in the schematic 500) may also be performed by a PID controller (not shown) of the vehicle 102. The PID controller may be same as the processor 242, or may be a different controller/unit in the vehicle 102. For the sake of simplicity of the present disclosure, it is assumed that the functions associated with the PID controller are performed by the processor 242.

Responsive to determining the actual vehicle velocity "$v_v$" (and calculating the target vehicle velocity "v" as described above), the processor 242 may compare the actual vehicle velocity "$v_v$" with the target vehicle velocity "v". Specifically, responsive to determining the actual vehicle velocity "$v_v$", the processor 242 may calculate a difference between the actual vehicle velocity "$v_v$" and the target vehicle velocity "v". The processor 242 may further determine a torque "τ" to be applied to one or more vehicle wheels (e.g., front and/or rear vehicle wheels) based on the comparison or the difference between the actual vehicle velocity "$v_v$" and the target vehicle velocity "v". The processor 242 may determine the torque "τ" such that the difference between the actual vehicle velocity "$v_v$" and the target vehicle velocity "v" becomes zero, or the actual vehicle velocity "$v_v$" matches or reaches to the target vehicle velocity "v". The torque "τ" may have a positive or negative value, based on whether the difference between the actual vehicle velocity "$v_v$" and the target vehicle velocity "v" is negative or positive.

Responsive to determining the torque "τ", the processor 242 may control the vehicle movement based on the torque "τ". Specifically, responsive to determining the torque "τ", the processor 242 may transmit a signal indicative of the torque "τ" to the BCM 220 or the vehicle axles, causing the vehicle wheels to move based on the torque "τ".

As the torque "τ" may be applied to the vehicle axles/wheels, a rate of change of actual vehicle velocity (shown as rate "$a_v$" in the schematic 500) may change. A person ordinarily skilled in the art may appreciate that the rate "$a_v$" may be a function of the torque "τ" applied to a front vehicle axle (shown as "$\tau_F$" in the schematic 500) and a rear vehicle axle (shown as "$\tau_R$" in the schematic 500). The rate "$a_v$" may also be a function of one or more environmental factors, such as tire/terrain friction interaction, actual vehicle mass, vehicle suspension dynamics, road friction, road slope/inclination angle, and/or the like. Stated another way, in some aspects and as shown in the schematic 500, the rate $a_v=f(\tau_R, \tau_F, env)$, where "env" denotes the environmental factors described above.

Responsive to determining the torque "τ", the processor 242 may determine the rate "$a_v$" by using the example mathematical expression described above. The processor 242 may further estimate/determine the actual vehicle velocity "$v_v$" (in addition to or alternative to determining the velocity "$v_v$" by using the inputs obtained from the VCU 210) and an actual vehicle distance travelled "$x_v$" based on the rate "$a_v$" (as "$a_v$" is a function of "$v_v$" and time, and "$v_v$" is a function of "$x_v$" and time, as described above).

The actual vehicle velocity "$v_v$", the actual vehicle distance travelled "$x_v$" and the target vehicle velocity "v" (and/or the distance "$x_c$") may be constantly "fed" to the processor 242 so that a dynamic feedback loop may be formed as shown in the schematic 500. The processor 242 may constantly determine and update the torque "τ" based on the changing actual vehicle velocity "$v_v$" and/or target vehicle velocity "v", so that the actual vehicle velocity "$v_v$" matches or reaches to the target vehicle velocity "v".

In further aspects, the processor 242 may determine and/or update the torque "τ" based on one or more additional parameters/factors associated with the vehicle 102 and/or a surface on which the vehicle 102 may be travelling/located. Examples of such additional parameters/factors are described below. In some aspects, irrespective of the parameters/factors used by the processor 242 to determine the torque "τ", the processor 242 may always attempt to cause the actual vehicle velocity "$v_v$" to match the target vehicle velocity "v" based on the determined "τ". Stated another way, the processor 242 may always attempt to cause the vehicle 102 to move at a velocity that may be desired by the user 104 (i.e., the target vehicle velocity "v"). The examples of parameters/factors described below based on which the processor 242 may determine and/or update the torque "τ" should not be construed as limiting. The processor 242 may determine and/or update the torque "τ" based on more or less parameters/factors, without departing from the present disclosure scope.

In a first exemplary aspect, the processor 242 may determine the torque "τ" based on a feed-forward push (shown as a block 502 in the schematic 500) applied to the vehicle 102 when the vehicle 102 first begins to move based on the force "$F_o$" applied by the user 104 on the interface 110. The feed-forward push may be a torque profile applied to the vehicle 102 to overcome an initial stiction associated with the vehicle 102 (e.g., when the vehicle 102 is stopped). The initial stiction may be a friction force that resists the initial vehicle movement. In this case, the processor 242 provide an initial bump of torque by following a torque add profile to get through the initial static friction. The processor 242 may further discontinue providing the torque add profile when the actual vehicle velocity "$v_v$" increases greater than a predefined velocity threshold (i.e., when the initial stiction ceases).

In a second exemplary aspect, the processor 242 may determine the torque "τ" based on a maximum permissible rate of change of vehicle velocity threshold, when the vehicle 102 may first start to move based on the force "$F_o$" applied by the user 104 on the interface 110 or the vehicle 102 may already be in motion. In this case, the processor 242 may determine the torque "τ" such that the rate of change of actual vehicle velocity (i.e., the rate "$a_v$") may be less than or equivalent to the maximum permissible rate of change of vehicle velocity threshold. In some aspects, the processor 242 may determine the torque "τ" based on the maximum permissible rate of change of vehicle velocity threshold to limit a vehicle speed request for initial movement. Specifically, the processor 242 may ensure that the rate "$a_v$" and/or the actual vehicle velocity "$v_v$" gradually ramps up (or gradually ramps down) so that the user 104 may conveniently and smoothly control the vehicle movement via the interface 110.

In a third exemplary aspect, the processor 242 may determine the torque "τ" based on a maximum permissible vehicle velocity threshold (e.g., 4-5 miles an hour), when the vehicle 102 may be in motion. In this case, the processor 242 may determine the torque "τ" such that the torque "τ" causes the vehicle 102 to move at the actual vehicle velocity "$v_v$" that is less than or equivalent to the maximum permissible vehicle velocity threshold. The processor 242 may reduce the torque "τ" to zero when the actual vehicle velocity "$v_v$" becomes greater than the maximum permissible vehicle velocity threshold.

In a fourth exemplary aspect, the processor 242 may update the torque "τ" to an updated torque value (e.g., a "wrong direction inertial boost" torque) when the processor 242 determines, based on the inputs obtained from the VCU 210, that the vehicle 102 may be moving in a wrong direction or a direction different than a direction intended by the user 104 (e.g., when the vehicle wheels may be slipping or rolling in a wrong direction). In some aspects, the updated torque value may be based on an actual vehicle velocity in the wrong direction. The updated torque may provide a strong response to the vehicle wheels, to get the vehicle direction changed/corrected.

In a fifth exemplary aspect, the processor 242 may update the torque "τ" to an updated torque value (e.g., a "vehicle stuck torque boost" value) when the processor 242 determines, based on the inputs obtained from the VCU 210, that the vehicle 102 is not moving when the torque "τ" is applied to the vehicle wheels. Stated another way, the processor 242 may update the torque "τ" to the updated torque value or add an additional torque to the torque "τ" when the user 104 may be applying the force "$F_o$" to the interface 110 (indicating that the user 104 desires the vehicle 102 to move) but the vehicle 102 may not be moving. In this case, the updated torque may cause the vehicle 102 to move when the updated torque may be applied to the vehicle axles/wheels. In some aspects, the processor 242 may add the additional torque to the torque "τ" until the vehicle 102 begins to move and may then revert to the torque "τ".

In a sixth exemplary aspect, the processor 242 may update the torque "τ" to an updated torque value (e.g., a "steering angle boost" torque) based on the steering angle of the vehicle steering wheel, which the processor 242 may determine based on the inputs obtained from the vehicle sensory system 232. A person ordinarily skilled in the art may appreciate that an additional torque may be required when the vehicle 102 may be turning. Therefore, in this case, based on the steering wheel angle, the processor 242 may provide/add an additional torque to the torque "τ" to enable the vehicle 102 to meet the required traction and cause the desired vehicle movement. In some aspects, the added additional torque may be a function of the steering wheel angle.

In a seventh exemplary aspect, the processor 242 may update the torque "τ" to an updated torque value based on an inclination angle or a grade of a road/surface on which the vehicle 102 may be travelling. In this case, the processor 242 may determine the road grade and/or the inclination angle based on the inputs obtained from the vehicle sensory system 232 and may then add/subtract an additional torque value to/from the torque "τ" based on the road grade and/or the inclination angle to enable the vehicle 102 to conveniently navigate the road/surface.

The processor 242 may further constantly update the torque "τ" based on the comparison of the target vehicle velocity "v" and the actual vehicle velocity "$v_v$" to cause the actual vehicle velocity "$v_v$" to match the target vehicle velocity "v", as described above. In further aspects, the processor 242 may constantly update the torque "τ" such that the torque "τ" may not exceed a predefined maximum torque limit associated with the vehicle 102.

Figure 6:
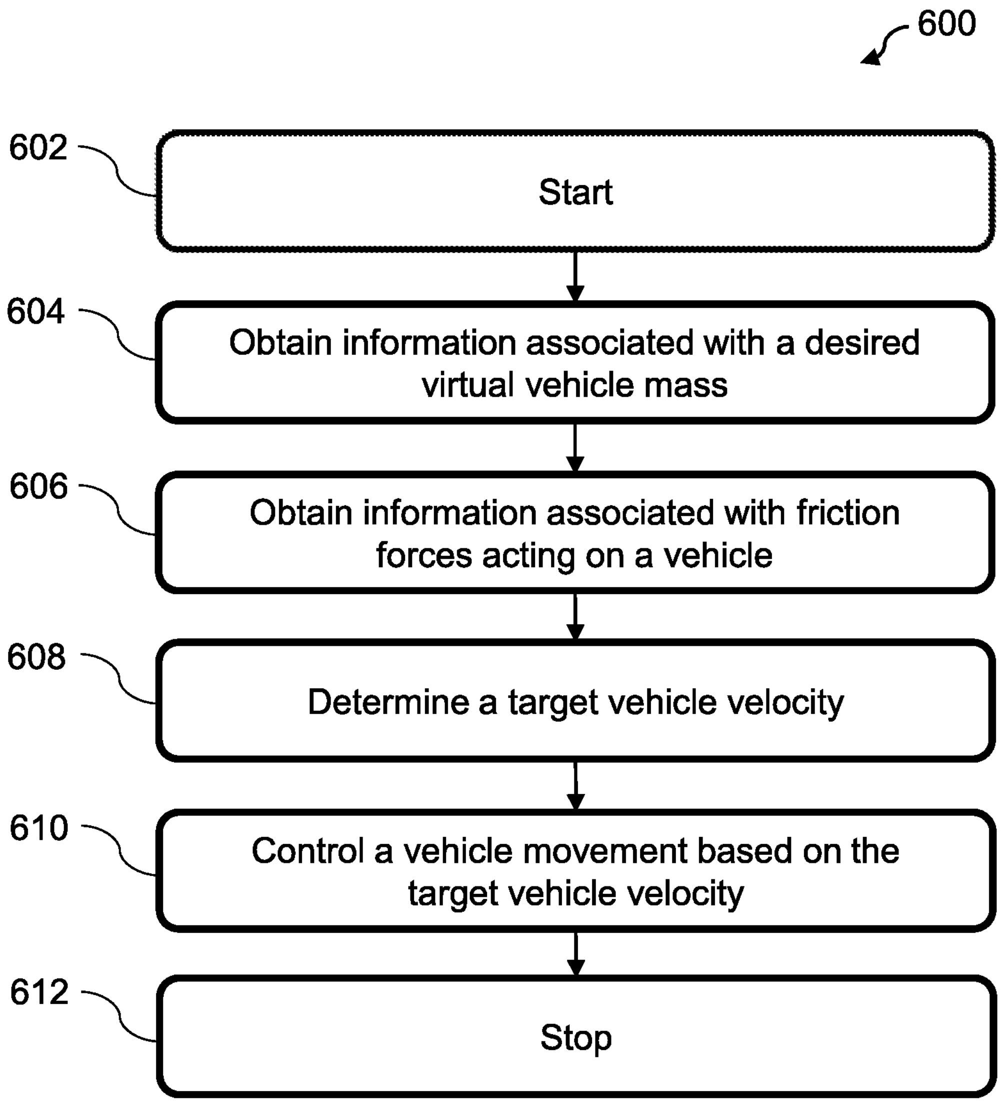
FIG. 6 depicts a flow diagram of a method for controlling a vehicle movement in accordance with the present disclosure.

FIG. 6 depicts a flow diagram of a method 600 for controlling a vehicle movement in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 242, the information associated with the desired virtual vehicle mass from the memory 244 and/or the server 204. At step 606, the method 600 may include obtaining, by the processor 242, the information associated with the friction forces acting on the vehicle 102 from the vehicle sensory system 232.

At step 608, the method 600 may include determining, by the processor 242, the target vehicle velocity "v" based on the signal indicative of the force "$F_o$" applied by the user 104 on the interface 110, the desired virtual vehicle mass and the information associated with the friction forces. At step 610, the method 600 may include controlling, by the processor 242, the vehicle movement based on the target vehicle velocity "v".

The method 600 may end at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

an external interface comprising a sensor configured to measure force, wherein the external interface is configured to be removably attached to a vehicle exterior surface;

a transceiver configured to receive a first signal indicative of a magnitude of force applied by a user on the external interface; and a processor communicatively coupled with the transceiver, wherein the processor is configured to:

obtain a value representing a desired virtual vehicle mass, wherein the desired virtual vehicle mass is less than an actual vehicle mass;

obtain information associated with one or more friction forces acting on the vehicle;

determine a target vehicle velocity based on the first signal, the desired virtual vehicle mass and the information associated with one or more friction forces; and control a vehicle movement based on the target vehicle velocity.

2. The vehicle of claim 1 further comprising a memory configured to store the information associated with the desired virtual vehicle mass, wherein the processor obtains the information associated with the desired virtual vehicle mass from the memory.

3. The vehicle of claim 1, wherein the desired virtual vehicle mass is indicative of a virtual mass associated with the vehicle configured to be felt by the user when the user applies the force on the external interface to enable the vehicle movement.

4. The vehicle of claim 1, wherein the one or more friction forces comprise a Coulomb friction, a viscous friction, or a Stribeck friction.

5. The vehicle of claim 1 further comprising a vehicle sensory system comprising at least one vehicle sensor configured to detect a presence of an obstacle in proximity to the vehicle.

6. The vehicle of claim 5, wherein the processor is further configured to:

obtain inputs from the vehicle sensory system;

determine an obstacle presence in proximity to the vehicle and an obstacle distance from the vehicle based on the inputs;

determine an amount of repulsive force configured to be applied to the external interface based on the obstacle distance responsive to determining the obstacle presence, wherein the amount of repulsive force is inversely proportional to the obstacle distance; and transmit a second signal to the external interface, wherein the second signal is indicative of the amount of repulsive force.

7. The vehicle of claim 6, wherein the processor is further configured to determine the target vehicle velocity based on the amount of repulsive force.

8. The vehicle of claim 6, wherein the processor is further configured to stop the vehicle movement when the obstacle distance is less than a predefined threshold.

9. The vehicle of claim 1, wherein the processor is further configured to:

determine an actual velocity of the vehicle;

compare the actual velocity with the target vehicle velocity;

determine, based on comparing the actual velocity with the target vehicle velocity, a torque to be applied to one or more vehicle wheels; and control the vehicle movement based on the torque.

10. The vehicle of claim 9, wherein the processor is further configured to determine the torque based on a torque profile applied to the vehicle to overcome an initial stiction associated with the vehicle.

11. The vehicle of claim 9, wherein the processor is further configured to determine the torque based on a maximum permissible vehicle velocity threshold, and wherein the torque causes the vehicle to move at a velocity less than or equivalent to the maximum permissible vehicle velocity threshold.

12. The vehicle of claim 9, wherein the processor is further configured to determine the torque based on a maximum permissible rate of change of vehicle velocity threshold, and wherein the torque causes a rate of change of vehicle velocity to be less than or equivalent to the maximum permissible rate of change of vehicle velocity threshold.

13. The vehicle of claim 9, wherein the processor is further configured to update the torque to an updated torque when the processor determines that the vehicle is moving in a wrong direction, and wherein the updated torque is based on a vehicle velocity in the wrong direction.

14. The vehicle of claim 9, wherein the processor is further configured to update the torque to an updated torque when the processor determines that the vehicle is not moving when the torque is applied to the one or more vehicle wheels, and wherein the updated torque causes the vehicle to move when the updated torque is applied to the one or more vehicle wheels.

15. The vehicle of claim 9, wherein the processor is further configured to update the torque to an updated torque based on a vehicle steering angle.

16. The vehicle of claim 9, wherein the processor is further configured to update the torque to an updated torque based on an inclination angle or a grade of a road on which the vehicle is travelling.

17. The vehicle of claim 1, wherein the external interface is configured to be removably attached to an external vehicle portion, and wherein the transceiver receives the first signal from the external interface.

18. A method to control a movement of a vehicle, the method comprising:

obtaining, by a processor, a value representing a desired virtual vehicle mass, wherein the desired virtual vehicle mass is less than an actual vehicle mass;

obtaining, by the processor, information associated with one or more friction forces acting on the vehicle;

determining, by the processor, a target vehicle velocity based on a signal indicative of a magnitude of force applied by a user on an external interface comprising a sensor configured to measure force, the desired virtual vehicle mass and the information associated with one or more friction forces, wherein the external interface is configured to be removably attached to a vehicle exterior surface; and controlling, by the processor, a vehicle movement based on the target vehicle velocity.

19. The method of claim 18, wherein the desired virtual vehicle mass is indicative of a virtual mass associated with the vehicle configured to be felt by the user when the user applies the force on the external interface to enable the vehicle movement.

20. A non-transitory computer-readable storage medium having instructions stored thereupon which, when executed by a processor, cause the processor to:

obtain a value representing a desired virtual vehicle mass, wherein the desired virtual vehicle mass is less than an actual vehicle mass;

obtain information associated with one or more friction forces acting on a vehicle;

determine a target vehicle velocity based on a signal indicative of a magnitude of force applied by a user on an external interface comprising a sensor configured to measure force, the desired virtual vehicle mass and the information associated with one or more friction forces, wherein the external interface is configured to be removably attached to a vehicle exterior surface; and control a vehicle movement based on the target vehicle velocity.

* * * * *